(12) United States Patent
Wu et al.

(10) Patent No.: US 11,387,988 B2
(45) Date of Patent: Jul. 12, 2022

(54) METHOD, DEVICE, AND COMPUTER PROGRAM PRODUCT FOR MANAGING MESSAGE IN APPLICATION SYSTEM

(71) Applicant: EMC IP Holding Company LLC, Hopkinton, MA (US)

(72) Inventors: Qian Wu, Chengdu (CN); Bo Hu, Chengdu (CN); Jing Ye, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 141 days.

(21) Appl. No.: 17/025,332

(22) Filed: Sep. 18, 2020

(65) Prior Publication Data

US 2021/0306143 A1 Sep. 30, 2021

(30) Foreign Application Priority Data

Mar. 24, 2020 (CN) .......................... 202010212131.1

(51) Int. Cl.
*H04L 9/08* (2006.01)
*H04L 9/40* (2022.01)

(52) U.S. Cl.
CPC .......... *H04L 9/0836* (2013.01); *H04L 9/0822* (2013.01); *H04L 9/0891* (2013.01); *H04L 63/0428* (2013.01)

(58) Field of Classification Search
CPC ... H04L 9/0836; H04L 9/0822; H04L 9/0891; H04L 63/0428
See application file for complete search history.

(56) References Cited

U.S. PATENT DOCUMENTS

| | | | |
|---|---|---|---|
| 8,028,049 B1 * | 9/2011 | Ellis ................. | G05B 19/41865 700/121 |
| 8,874,668 B2 * | 10/2014 | Eydelman ........... | H04L 61/1594 709/205 |
| 10,678,406 B1 * | 6/2020 | Banti ...................... | G06F 9/453 |
| 11,265,277 B2 | 3/2022 | Yegorin et al. | |
| 2015/0186494 A1 * | 7/2015 | Gilad ...................... | H04L 51/22 707/740 |
| 2018/0176273 A1 | 6/2018 | McEvoy et al. | |
| 2018/0188935 A1 | 7/2018 | Singh et al. | |
| 2019/0037258 A1 | 1/2019 | Lewis et al. | |

* cited by examiner

*Primary Examiner* — Duc C Ho
(74) *Attorney, Agent, or Firm* — BainwoodHuang

(57) ABSTRACT

An application system includes a plurality of objects, one of which has one of a plurality of object types. A first object associated with a first message in a plurality of messages in the application system is determined from the plurality of objects, the first message being generated based on the first object. A second object type having a dependency on a first object type of the first object is acquired based on a type dependency between a set of object types in the plurality of object types. The plurality of messages are searched for a second message generated based on a second object of the second object type. The first message and the second message are displayed associatively. Associated messages in a plurality of messages may be acquired, and then the plurality of messages are presented more clearly and more effectively.

20 Claims, 8 Drawing Sheets

| Identifier | Message content | Parent message |
|---|---|---|
| MESSAGE001 | | MESSAGE002 |
| MESSAGE002 | | MESSAGE003 |
| MESSAGE003 | | Null |
| MESSAGE004 | | MESSAGE002 |
| MESSAGE005 | | Null |
| ... | ... | ... |

FIG. 5

METHOD, DEVICE, AND COMPUTER PROGRAM PRODUCT FOR MANAGING MESSAGE IN APPLICATION SYSTEM

CROSS-REFERENCE TO RELATED APPLICATION

This application claims priority to Chinese Patent Application No. CN202010212131.1, on file at the China National Intellectual Property Administration (CNIPA), having a filing date of Mar. 24, 2020 and having "METHOD, DEVICE, AND COMPUTER PROGRAM PRODUCT FOR MANAGING MESSAGE IN APPLICATION SYSTEM" as a title, the contents and teachings of which are herein incorporated by reference in their entirety.

TECHNICAL FIELD

Various implementations of the present disclosure relate to management of application systems, and in particular, to a method, a device, and a computer program product for managing messages in an application system.

BACKGROUND

With the development of computer technologies, a variety of application systems have emerged at present. A large number of messages may be generated during operations of an application system so as to provide information about a state of the application system to an administrator and/or a user of the application system. For example, a message about a workload of the application system may be provided. For another example, when a failure occurs in some components of the application system, a message about the failure may be provided. With the operation of the application system, the administrator and/or user may be faced with a large number of messages, and some important messages may not be processed timely. In this case, how to manage messages in an application system more effectively and present the messages in an easier-to-view manner has become a hot topic of research.

SUMMARY OF THE INVENTION

Therefore, it is expected that a technical solution for managing messages in an application system more effectively can be developed and implemented. It is expected that the technical solution can be compatible with existing application systems and the messages can be presented more effectively by modifying various configurations of the existing application systems.

According to a first aspect of the present disclosure, a method for managing messages in an application system is provided. The application system includes a plurality of objects, one of which has one of a plurality of object types. In the method, a first object associated with a first message in a plurality of messages in the application system is determined from the plurality of objects, the first message being generated based on the first object. A second object type having a dependency on a first object type of the first object is acquired based on a type dependency between a set of object types in the plurality of object types. The plurality of messages are searched for a second message generated based on a second object of the second object type. The first message and the second message are displayed associatively.

According to a second aspect of the present disclosure, an electronic device is provided, including: at least one processor; and a memory coupled to the at least one processor and having instructions stored therein, wherein when executed by the at least one processor, the instructions cause the device to perform actions for managing messages in an application system performed in the application system. The application system includes a plurality of objects, one of which has one of a plurality of object types. The actions include: determining, from the plurality of objects, a first object associated with a first message in a plurality of messages in the application system, the first message being generated based on the first object; acquiring, based on a type dependency between a set of object types in the plurality of object types, a second object type having a dependency on a first object type of the first object; searching the plurality of messages for a second message generated based on a second object of the second object type; and displaying the first message and the second message associatively.

According to a third aspect of the present disclosure, a computer program product is provided. The computer program product is tangibly stored in a non-transitory computer-readable medium and includes machine-executable instructions that are used to perform the method according to the first aspect of the present disclosure.

BRIEF DESCRIPTION OF THE DRAWINGS

The features, advantages, and other aspects of the implementations of the present disclosure will become more obvious with reference to the accompanying drawings and the following detailed descriptions. Several implementations of the present disclosure are illustrated herein in an illustrative rather than restrictive manner. In the drawings, FIG. 1A schematically illustrates a block diagram of an interface for displaying messages in an application system according to a technical solution;

FIG. 1B schematically illustrates a block diagram of an interface for displaying messages in an application system according to an example implementation of the present disclosure;

FIG. 5 schematically illustrates a block diagram of a data structure of a message library according to an example implementation of the present disclosure;

DETAILED DESCRIPTION

Figure 2:
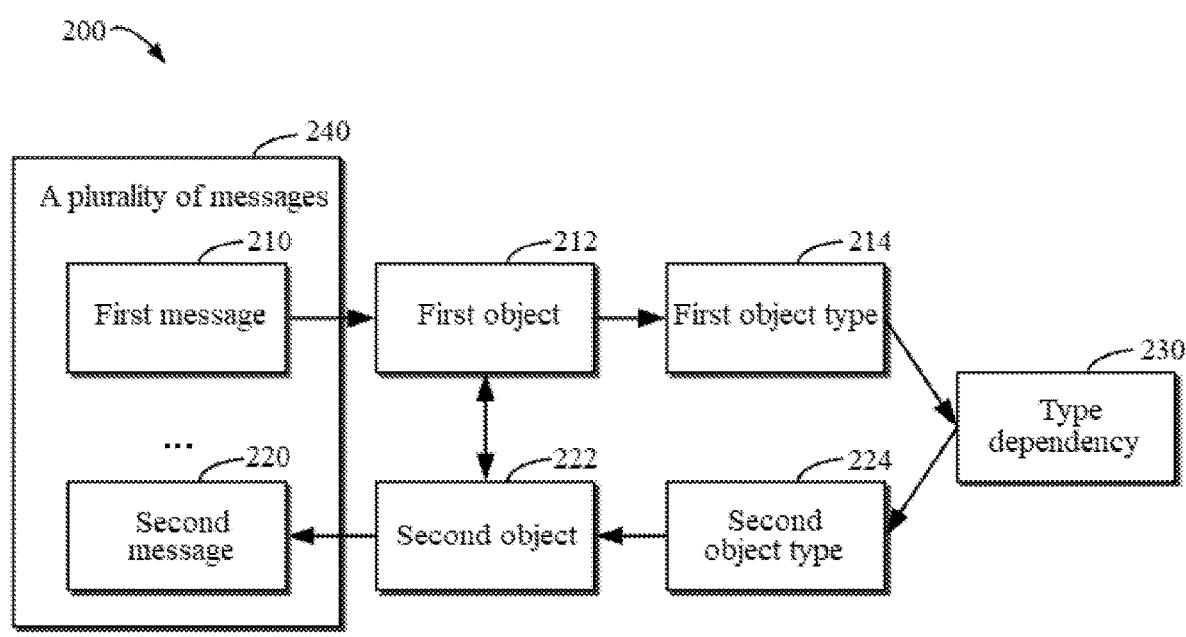
FIG. 2 schematically illustrates a block diagram of a process for managing messages in an application system according to an example implementation of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred implementations of the present disclosure will be described in more detail below with reference to the accompanying drawings. Although the preferred implementations of the present disclosure are shown in the accompanying drawings, it should be appreciated that the present disclosure can be implemented in various forms and should not be limited by the implementations described here. In contrast, the implementations are provided to make the present disclosure more thorough and complete, and the scope of the present disclosure can be fully conveyed to those skilled in the art.

The term "include" and its variants as used herein indicate open inclusion, i.e., "including, but not limited to." Unless specifically stated, the term "or" indicates "and/or." The term "based on" indicates "based at least in part on." The terms "an example implementation" and "an implementation" indicate "at least one example implementation." The term "another implementation" indicates "at least one additional implementation." The terms "first," "second," and the like may refer to different or identical objects. Other explicit and implicit definitions may also be included below.

Figures 1A, 1B:
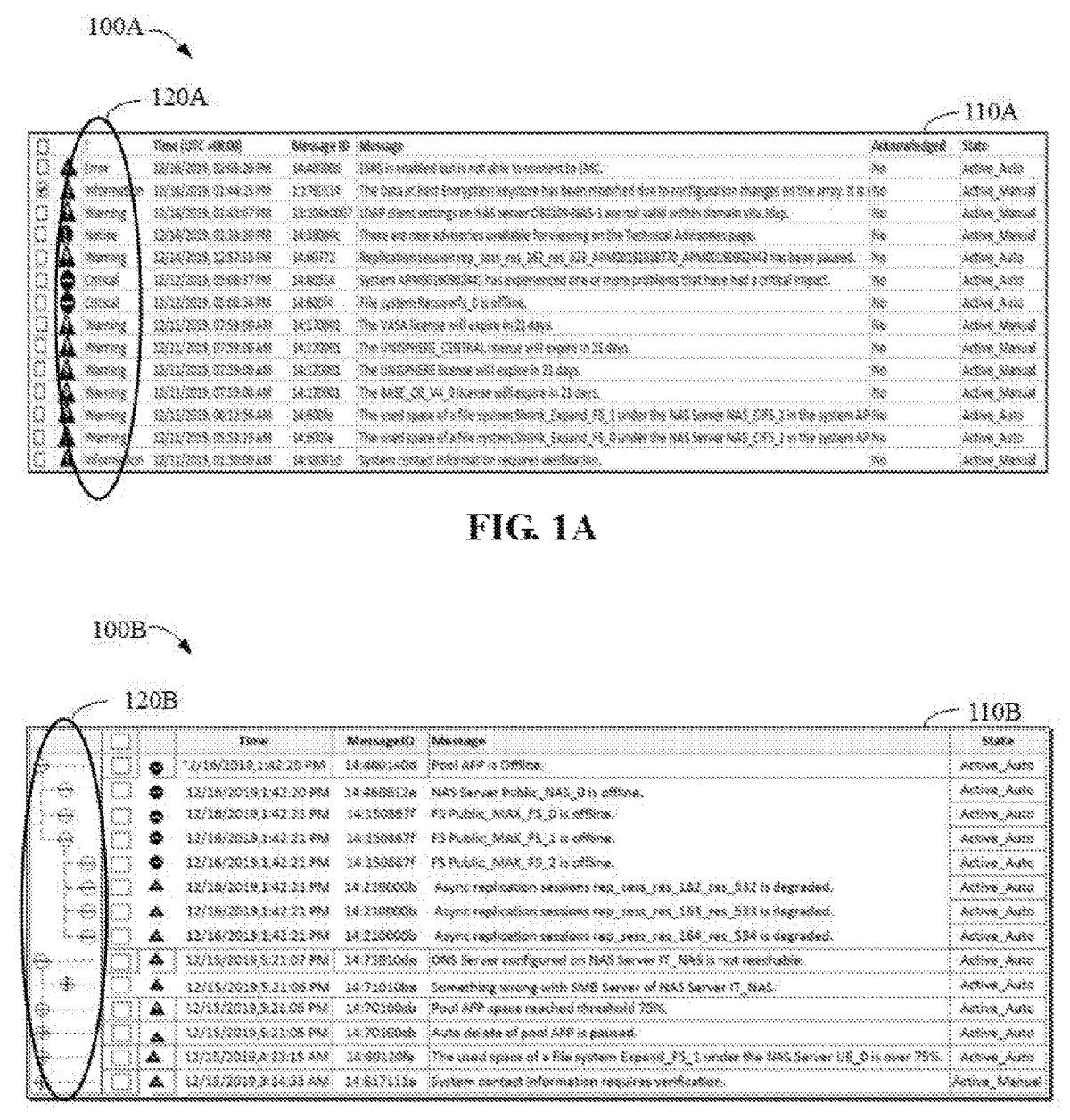

An application environment of an example implementation of the present disclosure is described first with reference to FIG. 1A. FIG. 1A schematically illustrates block diagram 100A of interface 110A for displaying messages in an application system according to a technical solution. For ease of description, a storage system will be used as an example of the application system for description in the context of the present disclosure. An overview of an operating environment of the storage system is provided at first. The storage system may include a plurality of storage devices. The storage devices may be located in a resource pool, and the storage space of the storage devices may be divided into a plurality of storage blocks for storing data. Further, a snapshot of data in a storage block may be taken to generate a snapshot of the block. For another example, data in a storage block may be replicated to form a replication session.

In this case, objects in the storage system may include any of a variety of types: a storage device, a resource pool, a data block, a snapshot, and a replication session. It will be appreciated that the storage system may include a large number of objects of a variety of types because the storage system includes a large number of storage devices and performs complex operations. A large number of messages may be generated during the operation of the storage system. A plurality of messages may be displayed in flat structure 120A in interface 110A. The plurality of messages are displayed side by side; as a result, the administrator and/or user of the application system can hardly distinguish degrees of urgency of the messages and has to read the messages one by one to determine the state of each object in the application system. It will be appreciated that there may be an association between the plurality of messages and each message may have a respective degree of urgency. The display manner shown in FIG. 1A makes it difficult for the administrator and/or user to determine the association between the plurality of messages, and some important messages may be omitted.

In order to at least partially address the above problem and one or more of other potential problems, a technical solution for managing messages in an application system is proposed in an example implementation of the present disclosure. Specifically, FIG. 1B schematically illustrates block diagram 100B of interface 110B for displaying messages in an application system according to an example implementation of the present disclosure. A plurality of messages may be displayed in interface 110B as shown in FIG. 1B. The plurality of messages may be displayed in association 120B. According to the example implementation of the present disclosure, associated messages in the plurality of messages may be provided clearly, and then the plurality of messages are presented more clearly and more effectively.

In the following, an overview of an example implementation of the present disclosure is described first with reference to FIG. 2. FIG. 2 schematically illustrates block diagram 200 of a process for managing messages in an application system according to an example implementation of the present disclosure. As shown in FIG. 2, for first message 210 in a plurality of messages 240, first object 212 associated with first message 210 may be determined. Herein, first message 210 is generated based on first object 210. In a storage system, first message 212 may be message A reporting that a failure occurs in a storage block. In this case, first object 212 is storage block B in which the failure occurs, and first object type 214 of first object 212 is "storage block."

Second object type 224 having a dependency on first object type 214 of first object 212 may be determined based on type dependency 230 (in which dependencies between a plurality of object types are stored). It will be appreciated that second object type 224 may be a resource pool since the storage block is from a storage resource pool in the storage system. Next, the plurality of messages 240 are searched for second message 220 generated based on second object 222 of second object type 224. On the assumption that storage block B is from resource pool C, in this case, second object 222 is resource pool C, and second message 220 is message D reporting that a failure occurs in resource pool C. When first message 210 and second message 220 have been determined, first message 210 and second message 220 (i.e., message A and message D) may be displayed associatively.

Figure 3:
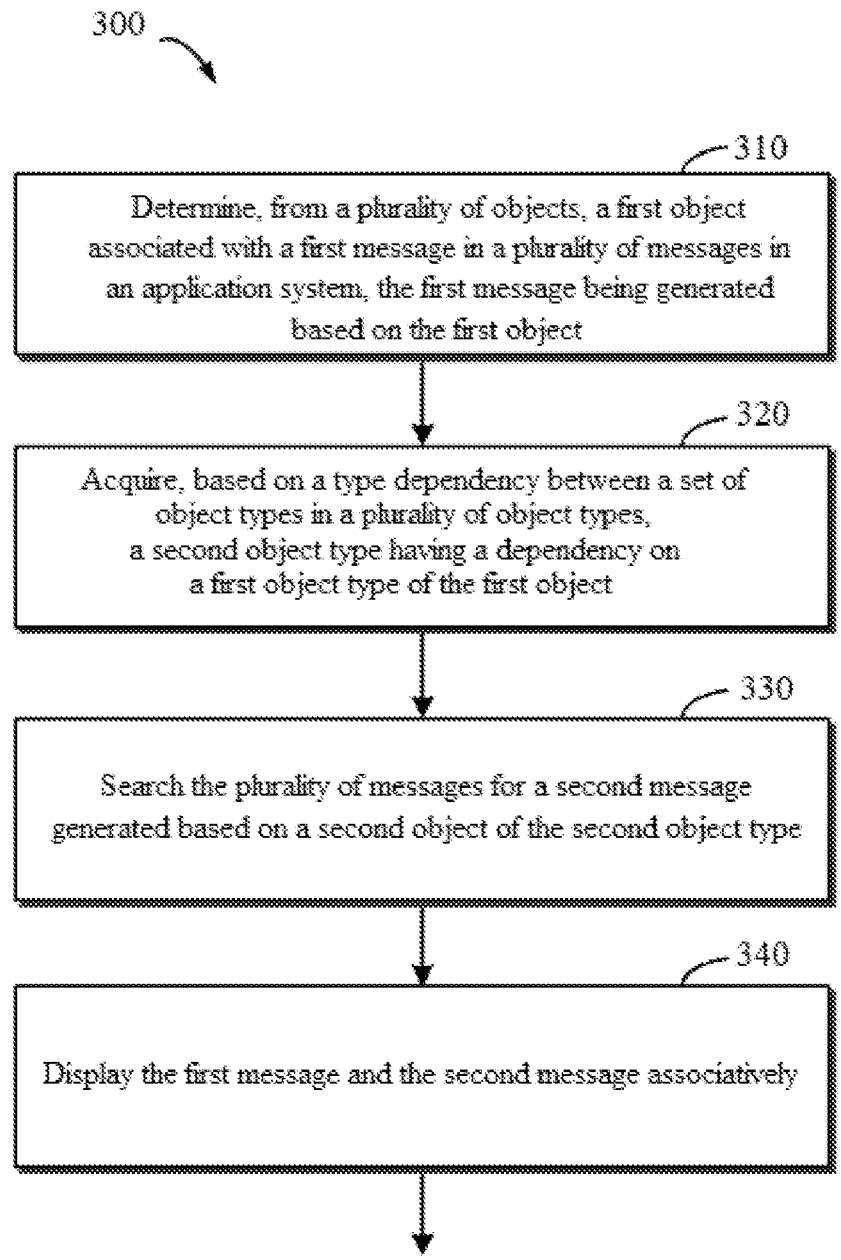
FIG. 3 schematically illustrates a flowchart of a method for managing messages in an application system according to an example implementation of the present disclosure.

In the following, more details of an example implementation according to the present disclosure will be described with reference to FIG. 3. FIG. 3 schematically illustrates a flowchart of method 300 for managing messages in an application system according to an example implementation of the present disclosure. In block 310, first object 212 associated with first message 210 in a plurality of messages 240 in the application system is determined, first message 210 being generated based on first object 212. According to the example implementation of the present disclosure, a message-object translator may be established to determine an object associated with a message, and a message associated with an object may also be determined.

The plurality of messages 240 may be recorded in the application system using a message list. The administrator and/or user may view the messages and process the messages. The message list may include message identifiers, message content, and states indicating whether messages have been processed. According to the example implementation of the present disclosure, different operations may be performed based on the states of the messages. It will be appreciated that different operations may be performed based on whether the messages have been processed. A situation where the first message is an unprocessed message is described first. According to an example implementation of the present disclosure, the method described below may be performed only for an unprocessed message based on the "state" in the message list. It will be appreciated that if a message has been processed, it indicates that the administrator and/or user have/has read content of the message and taken a corresponding measure. In this case, the unnecessary overhead of processing resources may be avoided by performing method 300 only for unprocessed messages, thereby improving the performance of the application system.

According to an example implementation of the present disclosure, the plurality of messages may include a warning message. It will be appreciated that there may be various types of messages in the application system, e.g., a state message reporting an operating state of the application system, and a warning message reporting a potential failure of the application system may also be included. Since a warning message has to be processed preferentially, an association between various warning messages in the application system may be displayed explicitly by processing the warning messages using method 300, so as to help the administrator and/or user to eliminate a failure as soon as possible.

Figure 4:
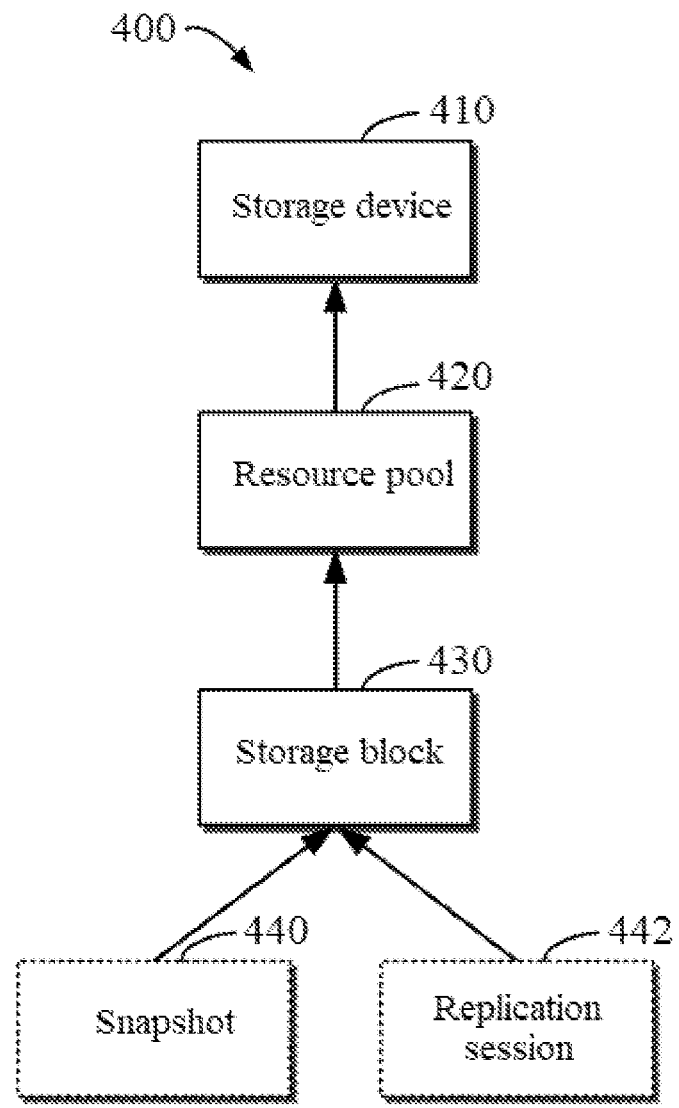
FIG. 4 schematically illustrates a block diagram of a type dependency according to an example implementation of the present disclosure.

In block 320, second object type 224 having a dependency on first object type 214 of first object 210 is acquired based on type dependency 230 between a set of object types in the plurality of object types. In the following, more details of type dependency 230 will be described with reference to FIG. 4. FIG. 4 schematically illustrates block diagram 400 of a type dependency according to an example implementation of the present disclosure, in which directions of arrows indicate dependencies between various types. Storage block 430 is from resource pool 420, and therefore, storage block 430 may depend on resource pool 420. The storage space in resource pool 420 is formed by the storage space in storage device 410, and thus resource pool 420 may depend on storage device 410.

On the assumption that first object type 214 of first object 210 is "storage block," then second object type 224 having a dependency on first object type 214 of first object 210 may be "resource pool 420." On the assumption that first object type 214 is "resource pool," then second object type 224 may be "storage device 410." In an initial stage of execution of method 300, type dependency 230 may include only predefined dependencies between some types. As method 300 is performed, more dependencies may be added to type dependency 230 constantly.

According to an example implementation of the present disclosure, type dependencies may be stored in an xml-format file or another data structure. For example, an xml file may initially include only part of the dependencies shown with solid lines in FIG. 4.

TABLE 1

Example of type dependency

```
<dependency>
  <objects>
    <object name="StorageBlock"><parent>Pool</parent></object>
    <object name="Pool"><parent>StorageDevice</parent></object>
  </objects>
<dependency>
```

For example, the statement <object name="StorageBlock"><parent>Pool </parent></object> in Table 1 indicates that storage block 430 depends on resource pool 420. The statement <object name="Pool"><parent>StorageDevice</parent></object> in Table 1 indicates that resource pool 420 depends on storage device 410. The xml file may be loaded to a cache. At this moment, if first object type 214 is "storage block" and/or "resource pool," second object type 224 may be determined based on a dependency. If first object type 214 is "snapshot," the type may be added to the cache since the type of snapshot does not belong to a set of object types shown with solid lines (that is, it is not in the cache).

With the operation of method 300, more and more new types will be added to the cache. Each newly added type may be processed one by one to find a dependency between the newly added type and the original type (or another new type). For example, a failure occurs in a snapshot in the storage system, and in this case, the type of first message 210 is "snapshot." The type of "snapshot" may be added to the cache since it is not included in the cache. Further, a dependency between the "snapshot" and another type of the object may be determined. In the storage system, an operation of taking a snapshot is performed for storage block 0 in the storage system, and thus a generated snapshot may depend on the storage block. As shown in FIG. 4, snapshot 440 shown with a dashed box may be added to type dependency 230, and snapshot 440 may be directed to storage block 430.

Similarly, a replication operation is also performed for a storage block in the storage system, and thus replication session 442 may depend on storage block 430. Replication session 442 illustrated with a dashed box may be added to type dependency 230, and replication session 442 may be directed to storage block 430. According to the example implementation of the present disclosure, type dependency 230 may be updated constantly based on newly discovered types. In this way, content of type dependency 230 may be enriched constantly, and thereby covering all the types in the application system as much as possible. According to an example implementation of the present disclosure, the updated type dependency in the cache may be written to an xml file for storing the dependency.

Referring back to FIG. 3, in block 330, the plurality of messages 240 are searched for second message 220 generated based on second object 222 of second object type 224. According to an example implementation of the present disclosure, second object 222 corresponding to first object 212 may be determined according to second object type 224. Still according to the example above, on the assumption that first object 212 is data block 001, then second object type 224 is "resource pool." A set of target objects of the type of "resource pool" in the storage system, i.e., resource pool 001, resource pool 002, . . . , and resource pool n, may be determined. On the assumption that data block 001 is from resource pool 001, it may then be determined that resource pool 001 is second object 222 corresponding to data block 001. Then, the plurality of messages may be searched for a message generated based on resource pool 001. In other words, the message generated for resource pool 001 may be used as second message 220.

In block 340, first message 210 and second message 220 are displayed associatively. According to an example implementation of the present disclosure, first message 210 and second message 220 may be displayed associatively in a separate list. For example, first message 210 and second message 220 may be displayed according to generation time of the two messages. Alternatively and/or additionally, the two messages may be displayed according to a dependency. For example, second message 220 may be marked as a parent message of first message 210, and second message 220 is displayed as a parent node of first message 210 in a hierarchical structure.

It will be appreciated that only two associated messages are schematically illustrated above. According to an example implementation of the present disclosure, there may be more associated messages. By use of the example implementation of the present disclosure, two or more messages having a dependency may be displayed explicitly to help the administrator and/or user know the state of the application system as soon as possible.

According to an example implementation of the present disclosure, the second message may be marked as a parent message of the first message. Further, the second message may be displayed as a parent node of the first message. The dependencies between the plurality of messages may be presented more explicitly using the hierarchy, thus facilitating a further operation of the administrator and/or user.

It will be appreciated that only details of processing first message 210 are schematically described above. According to an example implementation of the present disclosure, each of the plurality of messages 240 may be processed according to method 300 described above. According to an example implementation of the present disclosure, method 300 may be performed iteratively. For example, after second message 220 is found, method 300 may be performed for second message 220 to find another message that second message 220 depends on.

According to an example implementation of the present disclosure, second message 220 may be identified as a parent message of first message 210. Further, a message library may be provided to store dependencies between processed messages. FIG. 5 schematically illustrates block diagram 500 of a data structure of a message library according to an example implementation of the present disclosure. As shown in FIG. 5, the first column indicates identifiers of processed messages, the second column indicates message content, and the third column indicates parent messages of the messages. According to an example implementation of the present disclosure, the message library may be empty initially, and first message 210 and second message 220 that have been processed may be gradually added to the message library.

Specifically, first message "MESSAGE001" in the plurality of messages 240 may be processed to obtain parent message "MESSAGE002" of "MESSAGE001." At this moment, "MESSAGE001" and "MESSAGE002" may be added to the message library respectively, and the "parent message" of entry 510 where "MESSAGE001" is located is set to "MESSAGE002." Method 300 may also be performed subsequently for "MESSAGE002" to acquire parent message "MESSAGE003" of the message. "MESSAGE003" may be added to the message library, and the "parent message" of entry 520 where "MESSAGE002" is located is set to "MESSAGE003." "MESSAGE003" may be processed subsequently. On the assumption that no parent message is found, then the "parent message" of entry 530 where "MESSAGE003" is located may be set to null.

Each of the plurality of messages 240 may be traversed similarly, and the messages that have been processed are added to the message library one by one. According to an example implementation of the present disclosure, the plurality of messages may also be added to the message library first, and then content of the third column is updated as method 300 proceeds. By use of the example implementation of the present disclosure, with the operation of the application system, new messages generated by the application system may be processed constantly. In this way, associations between various messages in the application system may be found in real time to help the administrator and/or user know the state of the application system in real time and perform a corresponding operation.

Figure 6:
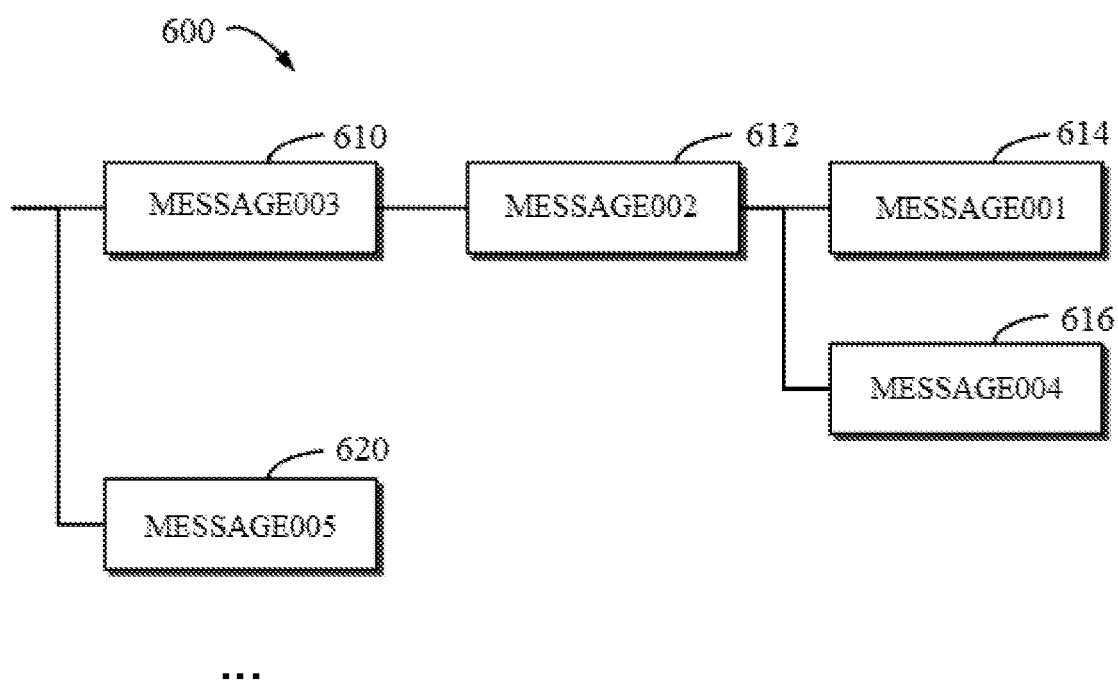
FIG. 6 schematically illustrates a block diagram of an interface for displaying messages in a tree structure according to an example implementation of the present disclosure.

According to an example implementation of the present disclosure, messages may be displayed based on the message library. Specifically, messages of the message library may be displayed in a tree structure. FIG. 6 schematically illustrates block diagram 600 of an interface for displaying messages in a tree structure according to an example implementation of the present disclosure. FIG. 6 illustrates a tree structure generated based on the message library shown in FIG. 5. It is defined in the message library that "MESSAGE003" is a parent message of "MESSAGE002," and thus node 610 is illustrated as a parent node of node 612. It is defined in the message library that "MESSAGE002" is a parent message of "MESSAGE001" and "MESSAGE004," and thus node 612 is illustrated as a parent node of nodes 614 and 616. It is defined in the message library that "MESSAGE005" has no parent node, and thus node 620 is illustrated alone.

By use of the example implementation of the present disclosure, a plurality of messages having dependencies may be illustrated clearly. The administrator and/or user may unfold or fold a plurality of associated messages by clicking nodes on various layers of a tree structure. In this way, a large number of messages in the application system may be displayed more easily and quickly.

According to an example implementation of the present disclosure, the administrator and/or user can view and process the displayed messages in real time. If a message has been processed, it indicates that a problem indicated by the message has been eliminated. In this case, a parent node of the message may be marked as null, and the message is no longer displayed. Further, the plurality of message may also be searched for a message that uses the message as a parent. Specifically, on the assumption that a message indicating that a failure occurs in a resource pool has been processed, then the failure of a storage block in the resource pool has been eliminated correspondingly, and thus a parent of the message indicating the failure of the storage block in the resource pool may be marked as null. By use of the example implementation of the present disclosure, an association between a processed message and another unprocessed message may be removed automatically. In this way, messages displayed according to the latest association may be presented to the administrator and/or user.

Figure 7:
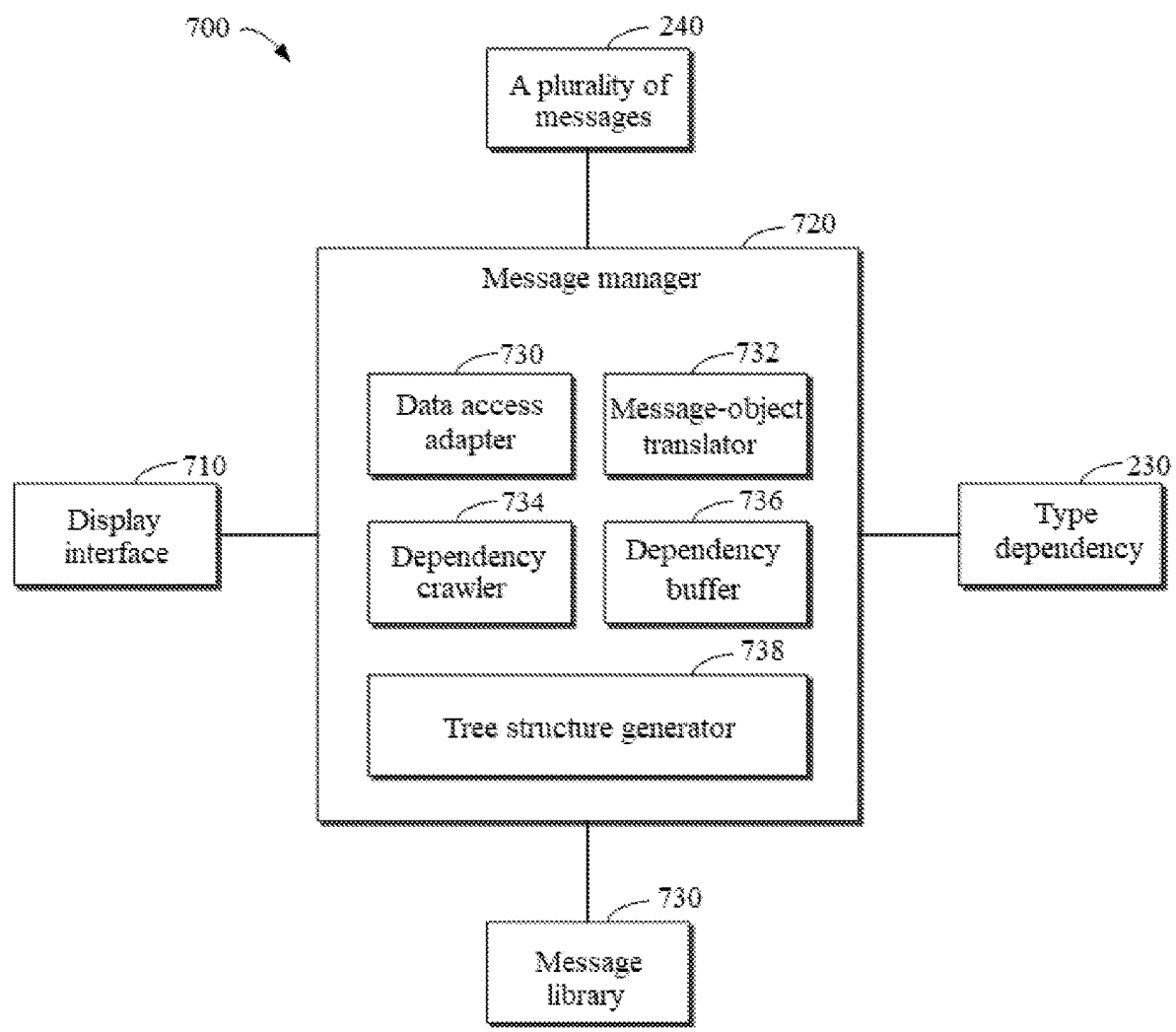
FIG. 7 schematically illustrates a block diagram of a message manager according to an example implementation of the present disclosure.

Various steps of method 300 have been described above with reference to FIG. 2 to FIG. 6. A message manager may be deployed in the application system to perform functions of method 300 described above. FIG. 7 schematically illustrates block diagram 700 of message manager 720 according to an example implementation of the present disclosure. Message manager 720 may include: data access adapter 730, message-object translator 732, dependency crawler 734, dependency buffer 736, and tree structure generator 738.

Specifically, data access adapter 730 may be configured to access a plurality of messages 240. Alternatively and/or additionally, data access adapter 730 may be configured to access type dependency 230. Message-object translator 732 may be configured to determine which object a message is generated for. Alternatively and/or additionally, message-object translator 732 may be configured to determine a message generated for an object. Dependency crawler 734 may be configured to progressively find dependencies between types of various objects in the application system. Dependency buffer 736 may be configured to store type dependency 230. Alternatively and/or additionally, dependency buffer 736 may be further configured to store a dependency newly found by dependency crawler 734. Tree structure generator 738 may be configured to generate, based on the dependencies in message library 730, a tree structure for display in display interface 710.

It will be appreciated that a method for managing messages in a storage system is described above by taking the storage system as a specific example of an application system. According to an example implementation of the present disclosure, the application system may further include other types of systems. For example, the application system may further include a switch system, and in this case, a plurality of objects in the switch system may include any of the following: a network interface controller, a port, a local area network, an IP address configuration, and so on. In this case, the type dependency may include that the local area network and the IP address both depend on the port, and the port may depend on the network interface controller. Messages in a network system may be managed in a manner similar to that described above. According to an example implementation of the present disclosure, the application system may further include another system such as a network system.

Examples of the method according to the present disclosure have been described above in detail with reference to FIG. 2 to FIG. 7, and the implementation of a corresponding apparatus will be described in the following. According to an example implementation of the present disclosure, an apparatus for managing messages in an application system is provided. The application system includes a plurality of objects, one of which has one of a plurality of object types. The apparatus includes: a determining module configured to determine, from the plurality of objects, a first object associated with a first message in a plurality of messages in the application system, the first message being generated based on the first object; an acquiring module configured to acquire, based on a type dependency between a set of object types in the plurality of object types, a second object type having a dependency on a first object type of the first object; a searching module configured to search the plurality of messages for a second message generated based on a second object of the second object type; and a display module configured to display the first message and the second message associatively. According to an example implementation of the present disclosure, the apparatus may further include corresponding modules for performing various steps in method 300.

Figure 8:
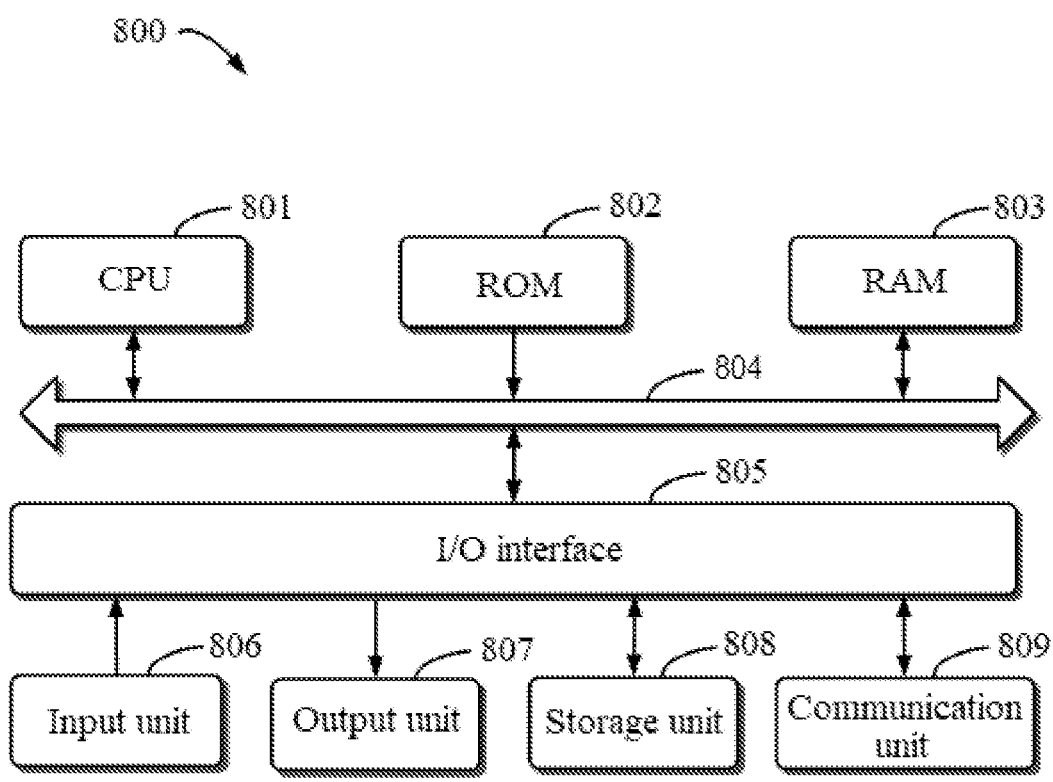
FIG. 8 schematically illustrates a block diagram of a device for managing messages in an application system according to an example implementation of the present disclosure.

FIG. 8 schematically illustrates a block diagram of device 800 for managing messages in a storage system according to an example implementation of the present disclosure. As shown in the figure, device 800 includes general processing unit (CPU) 801 that can perform various appropriate actions and processing according to computer program instructions stored in read-only memory (ROM) 802 or computer program instructions loaded from storage unit 808 to random access memory (RAM) 803. Various programs and data required for the operation of device 800 may also be stored in RAM 803. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disc; and communication unit 809, such as a network card, a modem, and a wireless communication transceiver. Communication unit 809 allows device 800 to exchange information/data with other devices over a computer network such as the Internet and/or various telecommunication networks.

The various processes and processing described above, for example, method 300, may be performed by processing unit 801. For example, in some implementations, method 300 may be implemented as a computer software program that is tangibly included in a machine-readable medium such as storage unit 808. In some implementations, some or all of the computer program may be loaded and/or installed onto device 800 via ROM 802 and/or communication unit 809. When the computer program is loaded into RAM 803 and executed by CPU 801, one or more steps of method 300 described above may be implemented. Alternatively, in other implementations, CPU 801 may also be configured in any other suitable manner to implement the above process/method.

According to an example implementation of the present disclosure, an electronic device is provided, including: at least one processor; and a memory coupled to the at least one processor and having instructions stored therein, wherein when executed by the at least one processor, the instructions cause the device to perform actions for managing messages in an application system performed in the application system. The application system includes a plurality of objects, one of which has one of a plurality of object types. The actions include: determining, from the plurality of objects, a first object associated with a first message in a plurality of messages in the application system, the first message being generated based on the first object; acquiring, based on a type dependency between a set of object types in the plurality of object types, a second object type having a dependency on a first object type of the first object; searching the plurality of messages for a second message generated based on a second object of the second object type; and displaying the first message and the second message associatively.

According to an example implementation of the present disclosure, searching the plurality of messages for the second message generated based on the second object of the second object type includes: determining the second object corresponding to the first object according to the second object type; and searching the plurality of messages for the second message generated based on the second object.

According to an example implementation of the present disclosure, displaying the first message and the second message associatively includes: marking the second message as a parent message of the first message; and displaying the second message as a parent node of the first message in a hierarchical structure.

According to an example implementation of the present disclosure, the actions further include: adding the first message and the second message to a message library; and displaying the first message and the second message based on the message library.

According to an example implementation of the present disclosure, the hierarchical structure includes a tree structure, and the actions further include: displaying messages of the message library in the tree structure.

According to an example implementation of the present disclosure, the actions further include: according to a determination that the first message has been processed, searching the plurality of messages for a third message, the first message being a parent message of the third message; and marking the third message as processed.

According to an example implementation of the present disclosure, the actions further include: inserting the first message into a message library according to a determination that the first object type does not belong to the set of object types; and setting a parent message of the first message as null.

According to an example implementation of the present disclosure, the actions further include: updating the type dependency based on a type dependency between the first object type and the set of object types.

According to an example implementation of the present disclosure, the first message is an unprocessed message in the plurality of messages.

According to an example implementation of the present disclosure, the application system includes a storage system, and the plurality of messages include a warning message.

According to an example implementation of the present disclosure, a computer program product is provided. The computer program product is tangibly stored in a non-transitory computer-readable medium and includes machine-executable instructions that are configured to perform the method according to the present disclosure.

According to an example implementation of the present disclosure, a computer-readable medium is provided. Machine-executable instructions are stored on the computer-readable medium, and when executed by at least one processor, the machine-executable instructions cause the at least one processor to implement the method according to the present disclosure.

The present disclosure may be a method, a device, a system, and/or a computer program product. The computer program product may include a computer-readable storage medium having computer-readable program instructions for performing various aspects of the present disclosure loaded thereon.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or a protruding structure in a groove on which instructions are stored, and any appropriate combination of the above. The computer-readable storage medium as used herein is not explained as transient signals per se, such as radio waves or other electromagnetic waves propagated freely, electromagnetic waves propagated through waveguides or other transmission media (e.g., light pulses propagated through fiber-optic cables), or electrical signals transmitted over electrical wires.

The computer-readable program instructions described here may be downloaded from the computer-readable storage medium to various computing/processing devices or downloaded to external computers or external storage devices over a network such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, including object-oriented programming languages such as Smalltalk and C++ as well as conventional procedural programming languages such as the "C" language or similar programming languages. The computer-readable program instructions may be executed completely on a user's computer, executed partially on a user's computer, executed as a separate software package, executed partially on a user's computer and partially on a remote computer, or executed completely on a remote computer or a server. In the case where a remote computer is involved, the remote computer may be connected to a user's computer over any kind of networks, including a local area network (LAN) or a wide area network (WAN), or may be connected to an external computer (e.g., connected over the Internet using an Internet service provider). In some implementations, an electronic circuit, such as a programmable logic circuit, a field programmable gate array (FPGA), or a programmable logic array (PLA), may be customized by utilizing state information of computer-readable program instructions. The electronic circuit can execute the computer-readable program instructions to implement various aspects of the present disclosure.

Various aspects of the present disclosure are described here with reference to flowcharts and/or block diagrams of the method, the apparatus (system), and the computer program product implemented according to the present disclosure. It should be understood that each block in the flowcharts and/or block diagrams and a combination of blocks in the flowcharts and/or block diagrams may be implemented by computer-readable program instructions.

The computer-readable program instructions may be provided to a processing unit of a general purpose computer, a special purpose computer, or another programmable data processing apparatus to produce a machine, such that the instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium, and the instructions cause a computer, a programmable data processing apparatus, and/or other devices to work in a specific manner, such that the computer-readable medium storing the instructions includes an article of manufacture that includes instructions for implementing various aspects of functions/actions specified in one or more blocks in the flowcharts and/or block diagrams.

The computer-readable program instructions may also be loaded onto a computer, another programmable data processing apparatus, or another device, such that a series of operational steps are performed on the computer, another programmable data processing apparatus, or another device to produce a computer-implemented process. As such, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a portion of an instruction that includes one or more executable instructions for implementing specified logical functions. In some alternative implementations, functions labeled in the blocks may occur in an order different from that labeled in the accompanying drawings. For example, two successive blocks may actually be performed basically in parallel, or they may be performed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed various implementations. Numerous modifications and changes are apparent to those of ordinary skill in the art without departing from the scope and spirit of the illustrated various implementations. The selection of terms as used herein is intended to best explain the principles and practical applications of the various implementations or the technical improvements to technologies on the market, or to enable other persons of ordinary skill in the art to understand the implementations disclosed here.

The invention claimed is:

1. A method for managing messages in an application system, the application system comprising a plurality of objects, one of which has one of a plurality of object types, the method comprising:
   determining, from the plurality of objects, a first object associated with a first message in a plurality of messages in the application system, the first message being generated based on the first object;
   acquiring, based on a type dependency between a set of object types in the plurality of object types, a second object type having a dependency on a first object type of the first object;
   searching the plurality of messages for a second message generated based on a second object of the second object type; and
   displaying the first message and the second message associatively.

2. The method of claim 1, wherein searching the plurality of messages for the second message generated based on the second object of the second object type comprises:
   determining the second object corresponding to the first object according to the second object type; and
   searching the plurality of messages for the second message generated based on the second object.

3. The method of claim 1, wherein displaying the first message and the second message associatively comprises:
   marking the second message as a parent message of the first message; and
   displaying the second message as a parent node of the first message in a hierarchical structure.

4. The method of claim 3, further comprising:
   adding the first message and the second message to a message library; and
   displaying the first message and the second message based on the message library.

5. The method of claim 4, wherein the hierarchical structure comprises a tree structure, and the method further comprises: displaying messages of the message library in the tree structure.

6. The method of claim 3, further comprising: according to a determination that the first message has been processed,
   searching the plurality of messages for a third message, the first message being a parent message of the third message; and
   marking the third message as processed.

7. The method of claim 1, further comprising:
   inserting the first message into a message library according to a determination that the first object type does not belong to the set of object types; and
   setting a parent message of the first message as null.

8. The method of claim 7, further comprising: updating the type dependency based on the type dependency between the first object type and the set of object types.

9. The method of claim 1, wherein the first message is an unprocessed message in the plurality of messages.

10. The method of claim 1, wherein the application system comprises a storage system, and the plurality of messages comprise a warning message.

11. An electronic device, comprising:
   at least one processor; and
   a memory coupled to the at least one processor and having instructions stored therein, wherein when executed by the at least one processor, the instructions cause the device to perform actions for managing messages in an application system performed in the application system, the application system comprising a plurality of objects, one of which has one of a plurality of object types, and the actions comprises:
      determining, from the plurality of objects, a first object associated with a first message in a plurality of messages in the application system, the first message being generated based on the first object;
      acquiring, based on a type dependency between a set of object types in the plurality of object types, a second object type having a dependency on a first object type of the first object;
      searching the plurality of messages for a second message generated based on a second object of the second object type; and
      displaying the first message and the second message associatively.

12. The device of claim 11, wherein searching the plurality of messages for the second message generated based on the second object of the second object type comprises:
  determining the second object corresponding to the first object according to the second object type; and
  searching the plurality of messages for the second message generated based on the second object.

13. The device of claim 11, wherein displaying the first message and the second message associatively comprises:
  marking the second message as a parent message of the first message; and
  displaying the second message as a parent node of the first message in a hierarchical structure.

14. The device of claim 13, wherein the actions further comprise:
  adding the first message and the second message to a message library; and
  displaying the first message and the second message based on the message library.

15. The device of claim 14, wherein the hierarchical structure comprises a tree structure, and the actions further comprise: displaying messages of the message library in the tree structure.

16. The device of claim 13, wherein the actions further comprise: according to a determination that the first message has been processed,
  searching the plurality of messages for a third message, the first message being a parent message of the third message; and
  marking the third message as processed.

17. The device of claim 11, wherein the actions further comprise:
  inserting the first message into a message library according to a determination that the first object type does not belong to the set of object types; and
  setting a parent message of the first message as null.

18. The device of claim 17, wherein the actions further comprise: updating the type dependency based on a type dependency between the first object type and the set of object types.

19. The device of claim 11, wherein the first message is an unprocessed message in the plurality of messages.

20. A computer program product having a non-transitory computer readable medium which stores a set of instructions to manage messages in an application system; the set of instructions, when carried out by computerized circuitry, causing the computerized circuitry to perform a method of:
  determining, from the plurality of objects, a first object associated with a first message in a plurality of messages in the application system, the first message being generated based on the first object;
  acquiring, based on a type dependency between a set of object types in the plurality of object types, a second object type having a dependency on a first object type of the first object;
  searching the plurality of messages for a second message generated based on a second object of the second object type; and
  displaying the first message and the second message associatively.

\* \* \* \* \*